Jan. 10, 1956 W. ERNST 2,730,074
SERVO-MOTOR VALVE
Filed April 3, 1951 4 Sheets-Sheet 1
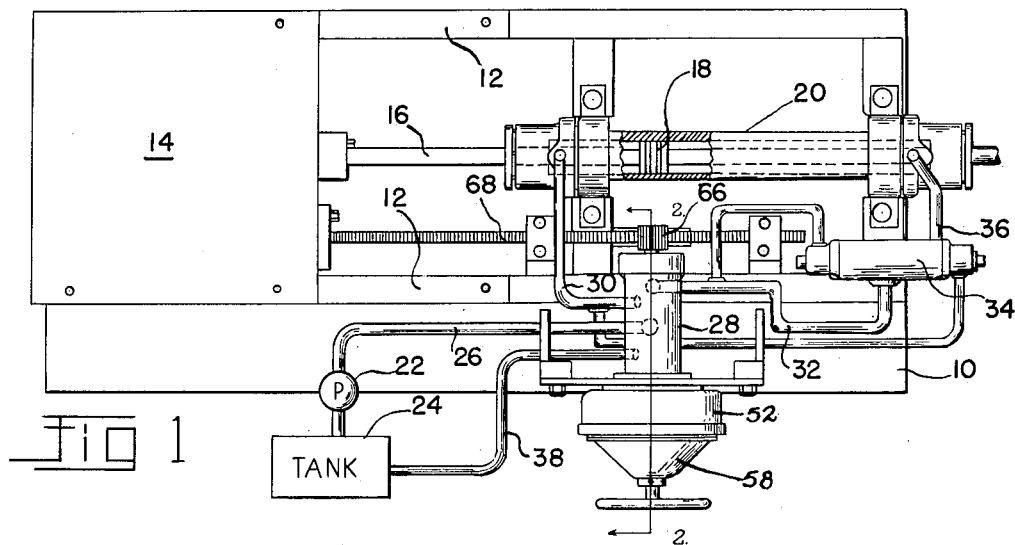
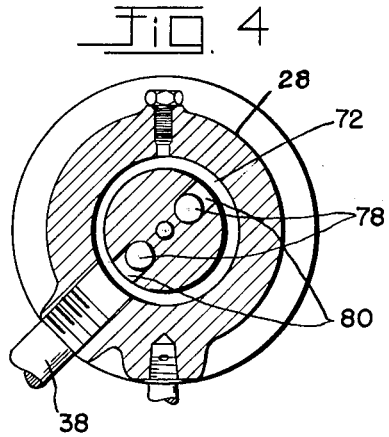
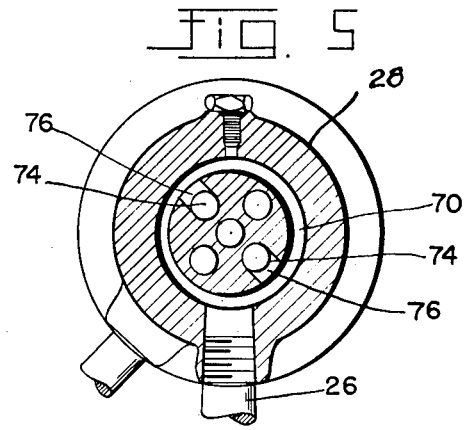
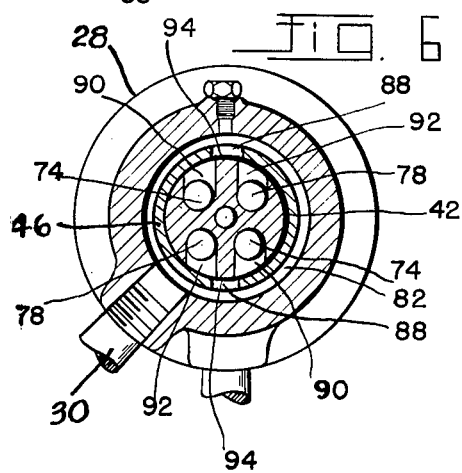
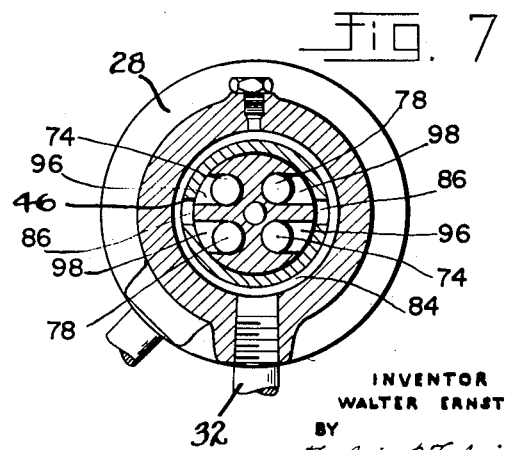
INVENTOR
WALTER ERNST
BY
Toulmin & Toulmin
ATTORNEYS.

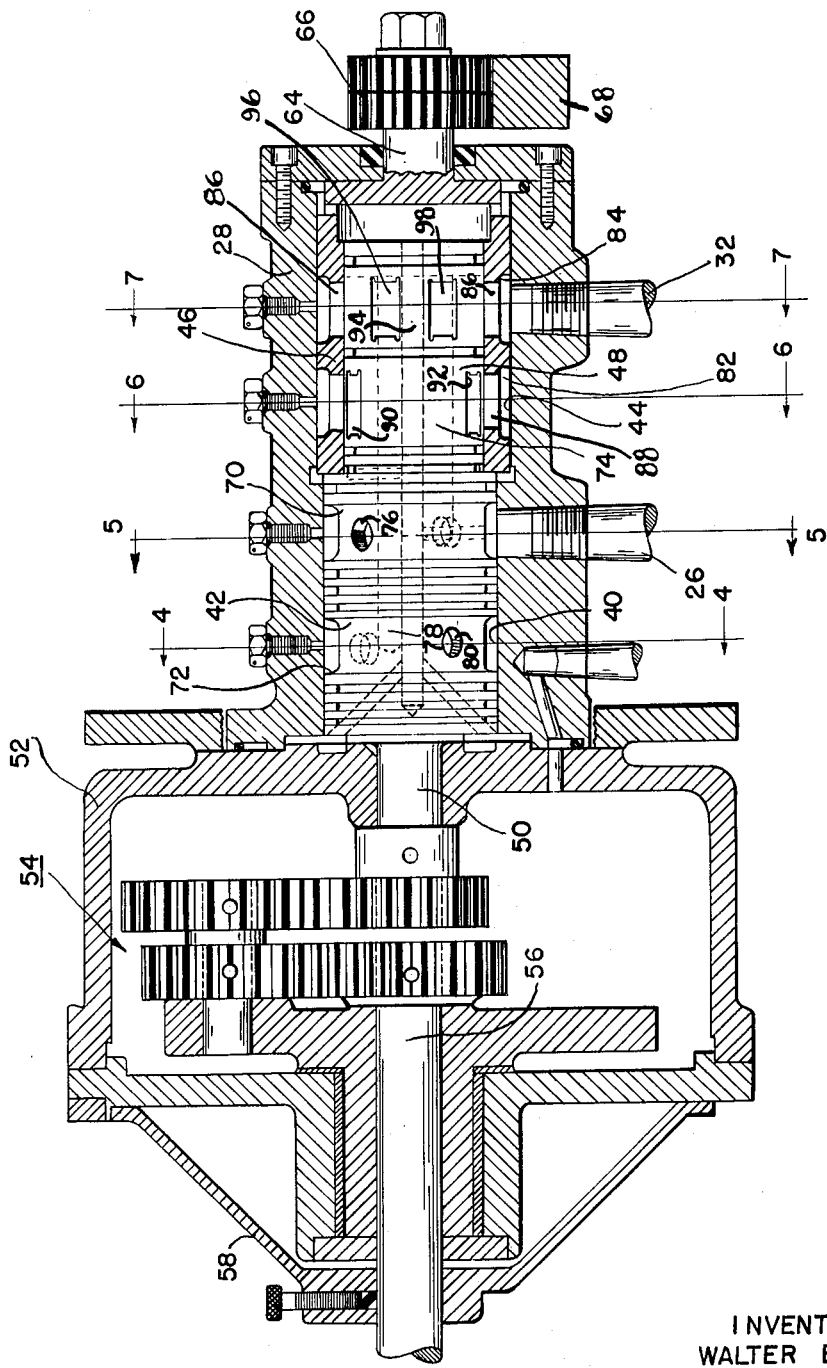

Jan. 10, 1956   W. ERNST   2,730,074
SERVO-MOTOR VALVE
Filed April 3, 1951   4 Sheets-Sheet 3
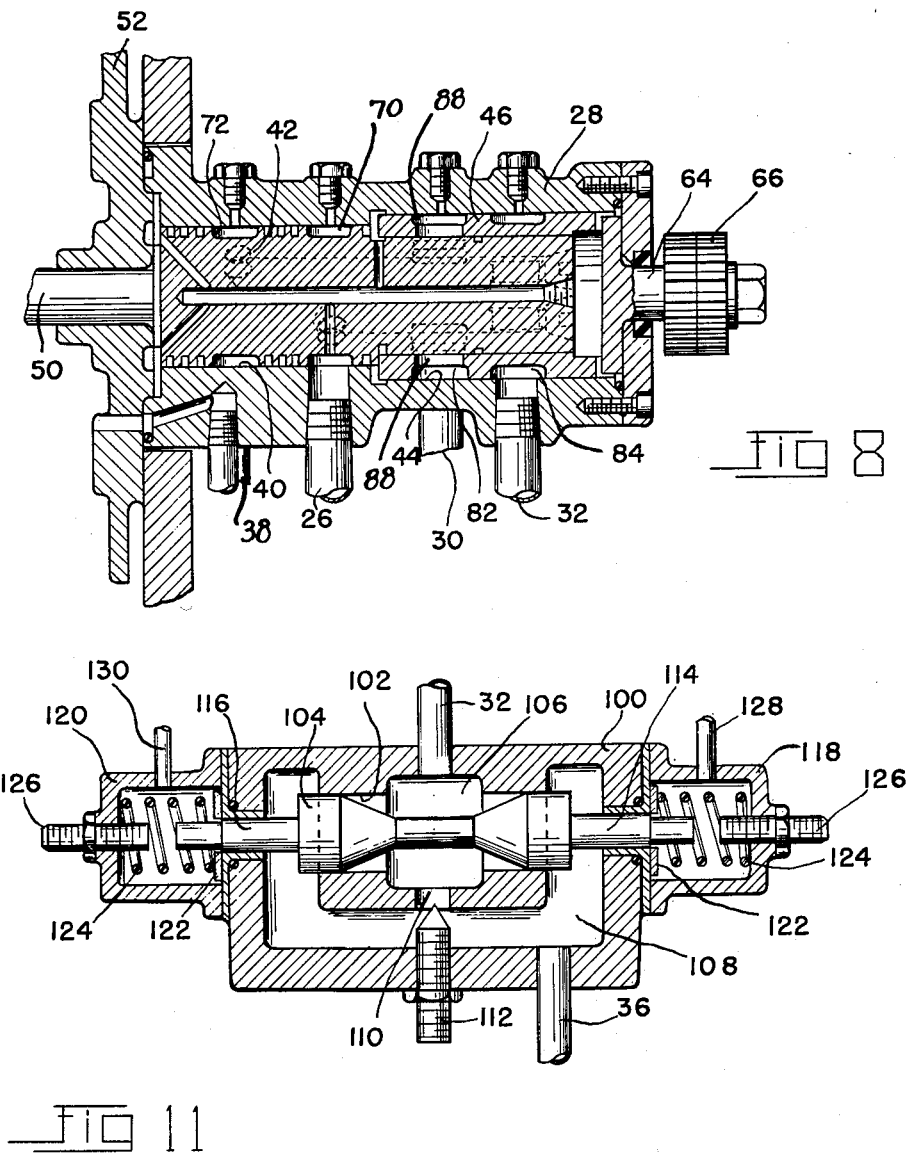
INVENTOR
WALTER ERNST
BY
ATTORNEYS Jan. 10, 1956   W. ERNST   2,730,074
SERVO-MOTOR VALVE
Filed April 3, 1951   4 Sheets-Sheet 4
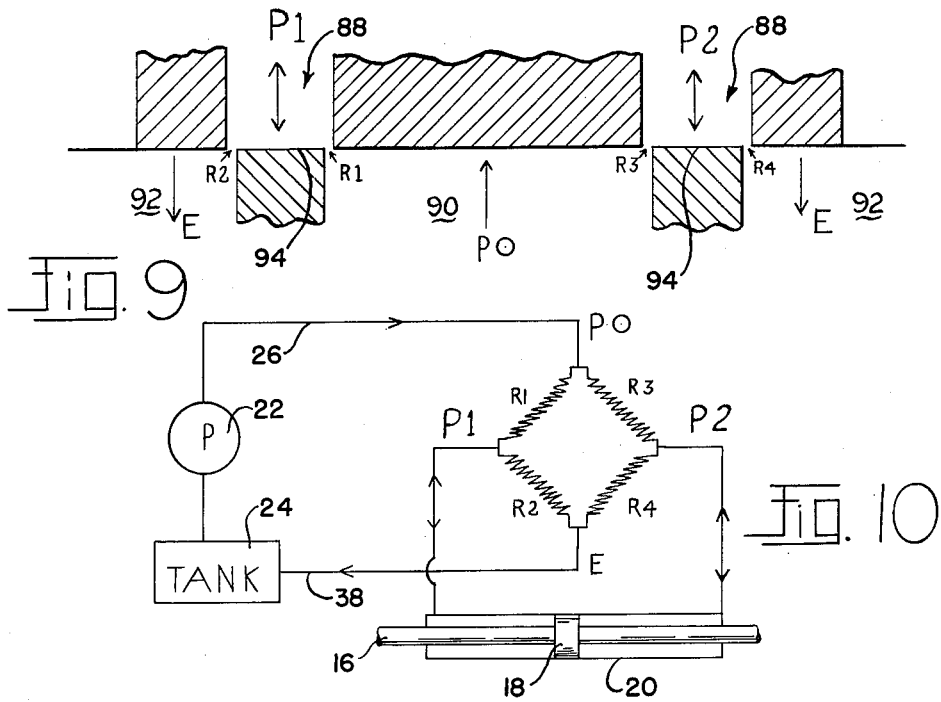
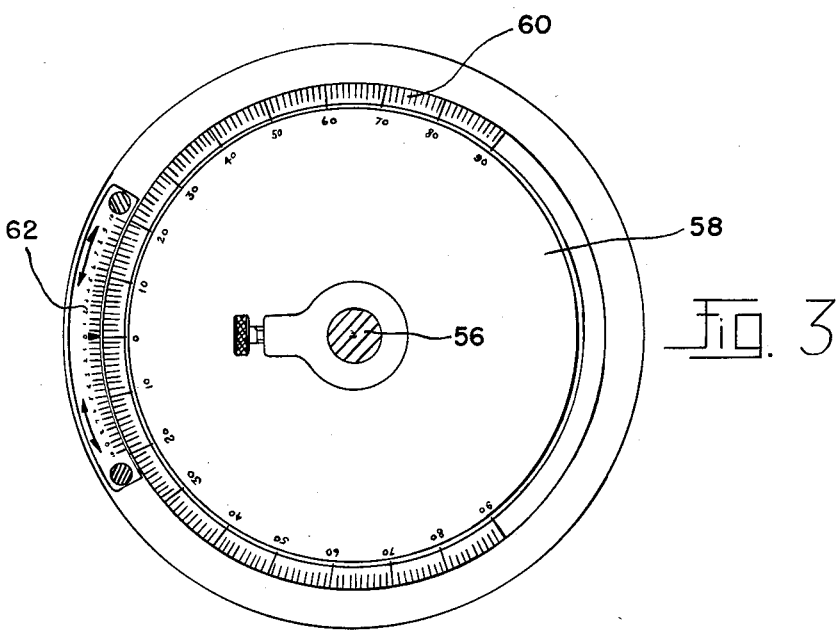
INVENTOR
WALTER ERNST
BY
Toulmin & Toulmin
ATTORNEYS.

United States Patent Office 2,730,074
Patented Jan. 10, 1956

2,730,074

SERVO-MOTOR VALVE

Walter Ernst, Dayton, Ohio, assignor to The Thompson Grinder Company, Springfield, Ohio, a corporation of Ohio Application April 3, 1951, Serial No. 219,039

8 Claims. (Cl. 121—41)

This invention relates to servo-motor mechanisms, particularly fluid operated mechanisms of this nature, and to a method of constructing and operating such mechanisms.

Servo-motor devices are well known in a number of arts and consist essentially of an amplifying instrumentality that is interposed between a control member and another member to be controlled. In the instant case, the interposed instrumentality is a hydraulic unit with the member to be controlled comprising a movable machine element or the like, and the control member comprising a manually operated hand wheel or similar adjustable member.

Servo-motors are employed for the purpose of amplifying the power exerted on the control member so that a slight manual effort is sufficient for moving a heavy element such as a machine tool slide or the like. Most servo-motors of this general type are of the follow-up type in that movement of the control member will cause one element of a control device to move and thereafter movement of the controlled member will move a second element in the control device in a direction to restore the two control elements to their initial relative positions. In this manner, a predetermined movement of the manual control member will always be accompanied by a predetermined and proportional movement of the controlled member.

In most instances, with follow-up servo-motors of the nature referred to, the available force for moving the controlled member as it approaches its designated position as determined by adjustment of the control member, diminishes, and will sometimes substantially disappear as the controlled member approaches very close to the said position. This condition, of course, introduces inaccuracies into the system and imposes a definite limit of precision because of which most servo-motor devices that were practical for use with machine tools and the like because of their construction were actually impractical because of inherent inaccuracies.

The inaccuracies as to the positioning of the controlled member, as discussed above, may be minimized, and sometimes almost completely eliminated, by constructing the servo-motor so that the relative positioning of the two movable control elements is critical. This, however, introduces other difficulties and will bring about hunting of the controlled member or surges of power thereto which will cause it to jump in one direction or the other, or makes the relative positioning of the control elements so critical that control of the manually adjusted member over the controlled member will sometimes be completely lost.

Having the foregoing in mind, the particular object of the present invention is to provide a servo-mechanism especially adapted for machine tools and the like which eliminates the difficulties referred to above.

A still further object is to provide a fluid operated servo-motor for use in connection with machine tools and the like which is exceedingly exact in operation.

A still further object is the provision of a fluid operated servo-motor which will operate to position the controlled member very closely, but in which hunting of the controlled member is eliminated.

It is also an object to provide a fluid operated servo-motor for machine tools and the like in which the controlled member is prevented from jumping ahead when the manually operated control member is adjusted.

It is also an object of this invention to provide an auxiliary valve for use with a fluid operated servo-motor which acts to prevent the controlled member associated with the servo-motor from jumping ahead, but which will, at the same time, permit full flow of actuating fluid to the said controlled member.

These and other objects and advantages will become more apparent upon reference to the following description taken in connection with the accompanying drawings in which:

Figure 1 is a plan view showing the servo-motor of this invention arranged in association with a machine tool element which is to be controlled.

Figure 2 is a longitudinal section taken through the servo-motor valve and the adjusting member therefor and is indicated by line 2—2 on Figure 1.

Figure 3 is an end view looking in from the left side of Figure 2 and showing the vernier arrangement associated with the controlling member.

Figures 4, 5, 6 and 7 are transverse sectional views through the servo-motor valve and are indicated on lines 4—4, 5—5, 6—6 and 7—7 respectively on Figure 2.

Figure 8 is a view similar to Figure 2, but showing the rotatable valve member of the servo valve in cross section.

Figure 9 is a diagrammatic view showing the arrangement of the ports of the servo valve according to this invention.

Figure 10 is a diagrammatic view illustrating the operation of the servo valve by a resistance network analogy; and Figure 11 is a longitudinal sectional view taken through an auxiliary valve associated with the servo-motor system of this invention.

Referring to the drawings somewhat more in detail, Figure 1 shows a plan view rather diagrammatically of a typical installation of the servomotor system of this invention. In this figure, there is a machine having a frame 10, comprising guideways 12, on which is slidably mounted a reciprocable machine element 14. This element may comprise the reciprocating table of a grinding machine, for example, or that of a planer or any other machine tool element that moves in accomplishing its work. Attached to member 14 is a ram 16, comprising a piston 18 positioned within cylinder 20, mounted in the machine frame. It will be noted that the ram or rod 16 extends out both ends of cylinder 20 and that both working faces of piston 18 are, therefore, the same area.

Mounted adjacent the machine is a pump 22 adapted for drawing fluid from a reservoir 24 and for discharging the fluid at increased pressure into a conduit 26. Conduit 26 leads to the body part 28 of the servo valve of this invention. This body part also has two service ports therein, one of which is connected by conduit 30 with the left end of cylinder 20, and the other of which is connected by a conduit 32 with the inlet of a control valve 34, forming a part of the system of this invention.

Control valve 34 also has a port connected by conduit 36 with the right end of cylinder 20.

The body 28 of the servo valve has an exhaust port that is connected by a conduit 38 with reservoir 24, thus completing the hydraulic circuit through the servo valve to the hydraulic motor comprising cylinder 20 and piston 18.

The construction of the servo valve will be better seen in Figures 2 through 8, wherein it will be observed that the body 28 of the servo valve is bored, as at 40, for receiving a rotatable valve member 42 and is also bored to a somewhat larger diameter at 44 for receiving the rotating valve sleeve 46. The valve sleeve 46 is also bored for receiving the reduced diameter portion 48 of the rotary valve member 42. This telescoping arrangement of the valve sleeve 46 and the valve member 42 provides extreme sensitivity of the second valve and is attained by reducing the area of the valve sleeve that is in frictional contact with other parts of the servo valve, and by reducing the areas of the valve sleeve that are subjected to warpage under hydraulic pressure which might tend to bring about binding of the valve sleeve.

Valve member 42 is provided with a shaft 50 at its left end that projects into casing 52 housing a gear reduction unit generally indicated at 54. Shaft 50 forms the output member of the gear reduction unit and the input member of the unit is represented by the shaft 56 which extends externally of housing 52 to have connected therewith the hand wheel 58. The hand wheel 58 is best seen in Figure 3, wherein it will be noted that the periphery of the hand wheel is graduated with a scale at 60 which cooperates with the fixed scale 62 on the cover of the housing 52 to provide a vernier arrangement by means of which the hand wheel can be precisely positioned at any predetermined point.

The rotatable member 46 which forms a sleeve between body member 28 and valve member 42 is also provided with a shaft 64 extending out the right end of the servo valve and to which is connected the split gear 66. The split gear 66 runs on a rack 68 (Figure 1), which rack is connected with reciprocable member 14.

At this point, it will be seen that adjustment of the hand wheel 58 will be accompanied by rotation of valve member 42 and that reciprocation of member 14 will be accompanied by rotation of sleeve member 46. This fact is availed of for controlling the supply of fluid to and from cylinder 20, thereby to control the reciprocation of member 14. The manner in which this control is effected will be seen on reference to Figures 1, 2 and 4 through 8. In Figure 2, it will be noted that the conduit 26 which conveys pressure from pump 22 is arranged to discharge into an annular groove 70 extending around the periphery of valve member 42. This will also be seen in Figure 5 which is a transverse section taken through the pressure level of the servo valve. Similarly, as will be seen in Figures 2 and 4, the exhaust conduit 38 is arranged to be continuously connected with annular groove 72 in the periphery of the valve member 42.

It should be borne in mind that the valve member and valve sleeve rotate relative to each other, and thus, at their mating surfaces, and which are the portions of the valve member and valve sleeve that cooperate for controlling the fluid flow, the relative direction of movement thereof is normal to the axis of the servo valve. Thus any reference to the direction of relative movement of the said member is intended to mean circumferential movement in a plane normal to the axis of the servo valve assembly.

The valve member 42 is provided with a plurality of longitudinal bores that are utilized for conveying fluid to and from the service conduits 30 and 32. As will be seen in Figures 2 and 4 through 8, two of these bores, as at 74, are connected with the annular groove 70 by means of the ports 76. Similarly, another two of these bores, as at 78, are continuously connected with groove 72 by means of the ports 80.

The several bores 74 and 78 extend longitudinally of the valve member into that part of the valve member within the sleeve 46. The sleeve 46 along its length is provided with a pair of peripheral grooves 82 and 84, groove 84 communicating with service conduit 32 and groove 82 communicating with service conduit 30. Each of the grooves 82 and 84 is intersected by diagrammatically opposite ports opening into the interior of sleeve 46. The ports intersecting groove 84 are identified at 86 and those intersecting groove 82 are identified at 88. The ports 86 and 88 are in the form of relatively long slots and are approximately the same length as ports provided in the valve member which are adapted for registration with the said ports 86 and 88. As will best be seen in Figures 6 and 7, the valve member 42 has the ports 90 opening from the bores 72 to the outer periphery of the valve member and adapted for registration with the ports 88 in sleeve 46. Similarly, bores 78 are provided with corresponding ports 92. Ports 90 and 92 are spaced apart to leave a land area therebetween, as at 94, of about the same circumferential extent as the ports 88. As will be more fully developed hereinafter, the land area at 94 is of slightly less extent than the ports 88 in order to provide for the improved control action to be had by the servomotor mechanism of this invention.

In Figure 7 it will be seen that the bores 74 are intersected by the ports 96 that open to the periphery of the valve member and that the bores 78 have the ports 98 so opening to the periphery of the valve member. Ports 96 and 98 are spaced apart similarly as was described in connection with ports 90 and 92. At this point, it will be evident that rotation of the valve member, say, in a clockwise direction as viewed in Figures 6 and 7, will communicate the pressure bores 74 with the annular groove 82 and the suction bores 78 with the annular groove 84. This will bring about fluid flow to the hydraulic motor in a direction to move member 14 and rack 68 in a direction to cause sleeve 46 to turn in a clockwise direction and to bring the said sleeve and the valve member back to their original relative positions.

Turning now to Figures 9 and 10, there is illustrated therein more or less diagrammatically one of the more important features of the present invention. This feature is that of providing a flow path for fluid from the pressure side of the servo valve to the exhaust side thereof when the valve member and valve sleeve are in a neutral position. This is done for the purpose of obtaining quick response of the controlled motor when the servo valve is adjusted and to obtain accurate positioning of the movable part of the motor in response to the adjusting of the servo valve.

By tests and experimentation, it was found that in a servo valve of the general type with which this application is concerned where the pressure and exhaust ports were completely closed off in neutral, there was required a substantial movement of the valve member before the pressure available for operating the motor was sufficient to cause movement thereof. This, of course, resulted in slow response of the motor and inaccurate positioning thereof.

Upon investigation of the best available sources concerning the flow of hydraulic fluids, it appeared that a quicker response and a more accurate positioning of the motor would obtain if a path were left between the pressure and exhaust ports of the servo valve when the valve was in neutral, thus making the valve a modulating device instead of an on-off device. As an example of the desired accuracy in a grinding machine or other machine tool of similar nature, it would be acceptable to be able to position the movable member to within limits of .0005 inch.

Initial calculations of the amount of valve opening to give a flow path through the valve in its neutral position that would tend to produce this accuracy indicated at clearance on the order of .00025" on each side of the neutral land area with the adjacent ports being on the order of 1" in length, the said length being selected to give an adequately large flow path but, at the same time, limiting the amount of leakage through the valve when in its neutral position.

The theory was that this would establish a condition like a Wheatstone bridge, and it was assumed that laws equivalent to those of Ohm and Kirchhoff would govern the behavior of the hydraulic fluid flow. Tests, however, proved this assumption to be completely wrong because actually, in very narrow passages, which may be referred to as "capillary passages," the flow of fluid is erratic and cannot be said to follow any fixed law. However, it was determined that, if the passages could be made a predetermined minimum size, then the fluid flow would become turbulent and remain turbulent and follow the square root law as set forth in Torricelli's equation. This indicated that a minimum clearance or, negative lap, on the order of .001″ should be provided on each side of the land area of the valve to provide for stable flow conditions.

Based on the indication that a minimum negative lap of .001″ was required, a model having a negative lap of .002″ was constructed. In this model, it was found that for small displacements of the valve member, there was a quick rise in pressure for operating the fluid motor. For example, it was found for a displacement of the valve member, measured at the periphery thereof, of .0002″ the pressure difference available for moving the motor was about 40% of the impressed pressure on the servo valve. This pressure is normally sufficient for moving the hydraulic motor and whatever parts that are connected therewith since the pump is selected to deliver an excess of pressure, and results in the degree of accuracy referred to above as desirable. It was found that the leakage through the valve was economically tolerable and that stable operation obtained under all conditions.

The valve construction described above has been illustrated diagrammatically in Figures 9 and 10. Figure 9 indicates the clearances on each side of the land area of the valve member as resistances labeled $R_1$, $R_2$, $R_3$ and $R_4$. These resistances also form a network like a Wheatstone bridge, as will be seen in Figure 10 where the motor is connected to two opposite corners of the bridge and the supply pump is connected across the other two corners of the bridge. Referring to the port arrangement of Fig. 6, $P_0$ indicates the fluid under pressure from the pressure bores 74 through the pressure ports 90. Since the fluid is from the same source both ports 90 are indicated as one opening in Figure 9.

The fluid under pressure passes through the service ports 88 through the clearances indicated at $R_2$ and $R_4$ into the suction ports 92 as indicated by E on Figure 9. Therefore, Figures 9 and 10 illustrate the flow of fluid in the servo valve when it is in neutral position.

While the arrangement described above results in a very accurate arrangement, with a quick response of the fluid motor to adjustments of the servo valve, it also introduces certain difficulties in that the substantially instantaneous response of the motor gives it a tendency to hunt or run ahead, particularly where the machine part being moved is heavy and has considerable inertia. Such a case would arise in connection with a grinding machine when the motor was connected to move the table.

An attempt to overcome this difficulty was made by providing chokes in the hydraulic lines to the motor and while this reduced the tendency of the motor to hunt or run ahead without effecting the accuracy of the positioning thereof, it also reduced the rapidity of response of the motor to adjustments of the valve and created a condition where there was a possibility that the valve would run ahead of the motor.

To overcome this difficulty, the valve illustrated in Figure 11 was developed. This valve is inserted in one of the hydraulic lines leading to the hydraulic motor, as, for example, in the conduit 32, 36 as illustrated in Figure 1.

This valve comprises a body 100 having a valve bore 102 in which is reciprocably mounted valve member 104. Conduits 32 and 36 extend into the valve body with conduit 32 communicating with a central chamber 106 and conduit 36 communicating with an outer chamber 108. Communication is had between the chambers via port 110 adapted for variable restriction by adjustable needle valve 112. Needle valve 112 and port 110 provide the restriction in conduit 32, 36 necessary to prevent the fluid motor from jumping ahead of the servo valve or from hunting.

In order to reduce the restriction offered by the valve when it is desired to move the motor rapidly, valve member 104 is arranged to reciprocate to open the ends of bores 102 into chamber 108, thereby providing a by-pass around port 110 of substantially less restriction than that offered by the said port. Valve 104 is arranged to reciprocate by having reduced diameter and parts 114 and 116 thereon that extend into pilot chambers 118 and 120 respectively. Within the pilot chambers, ends 114 and 116 are shouldered and receive a washer 122. The springs 124 bear on the washers and urge the valve member 104 toward its neutral position. Adjustable stop screws 126 may be provided for predetermining the maximum amount of movement of valve member 104 in either direction from its neutral position, thereby to control the degree of restriction offered by the by-pass established when the valve member shifts.

Pilot chamber 118 is connected with either one of conduits 30 or 32 and preferably closely adjacent servo valve 28 by the pilot conduit 128. Similarly, pilot chamber 120 is connected to the other of the service conduits by pilot conduit 130. The arrangement is such that normal slow adjustments of servo valve 28 will not supply sufficient pressure to either of the service conduits to bring about shifting of valve member 104. For example, the springs 124 may be so selected that the valve member will only shift when approximately 75% of the pressure of the supply pump is delivered to one of the service conduits. However, when the servo valve is adjusted quickly and the pressure builds up rapidly in one of the other service conduits, this pressure is conveyed to one of the other of the pilot chambers to act on the adjacent end of the valve member 104 to shift the valve member into its by-pass establishing position. With valve member 104 so shifted, the motor will readily follow the most rapid adjusting movements of the servo valve. As adjustment of the servo valve is slowed down, the original conditions tend to be restored and the valve member 104 returns to its neutral position and again establishes the restriction through port 110 which will prevent the fluid motor from hunting and overrunning.

From the foregoing, it will be seen that by this invention there is provided a fluid operated servo-motor arrangement including a servo valve in which the controlled member driven by the motor responds substantially instantaneously to movements of the control member connected to drive the valve and wherein the positioning of the controlled member is highly accurate, thereby meeting the demands of the precision machine tool trade.

The invention also provides, in combination with the rapid and accurate servo-motor arrangement, an auxiliary mechanism in the form of a variable by-pass valve which, at all times, maintains the hydraulic circuit between the servo-motor of the system and the servo valve of the system in such a condition that, while the motor can follow the most rapid adjustments of the servo valve, it cannot hunt about its rest position or overrun the servo valve.

It will be understood that I do not wish to be limited to the specific embodiment of my invention set forth in the foregoing description and the accompanying drawings, but desire to comprehend such changes thereof and such substitutions of equivalents therefor, as may be further desirable to adapt my invention to different conditions and usages.

I claim:

1. In a servo-valve; a valve casing, a valve sleeve rotatably mounted in said casing adjacent to one end thereof, a rotatable valve member in said casing adjacent the other end thereof, said valve sleeve and valve member telescoping over a portion only of their lengths, pressure and exhaust ports in the said other end of said casing and pressure and exhaust channels in said valve member in continuous communication with said ports, a pair of axially spaced service ports in the said one end of said casing and a pair of service ports in said valve sleeve in continuous communication therewith, and said pressure and exhaust channels terminating in ports in the respective planes of the service ports in the said valve sleeve.

2. In a rotary servo-valve: a valve casing having a cylindrical bore, a cylindrical valve member fitting the bore at one end of the valve casing and having a reduced diameter portion projecting toward the other end of the casing, a valve sleeve in the said other end of the valve casing fitting the annular space between the bore in the casing and the said portion of the valve member, pressure and exhaust channels in said valve member terminating in ports opening to the interior of said sleeve, ports in the sleeve adapted for registration with the said ports in said valve member, and ports in said casing in continuous communication with the channels in said valve member and the ports in said valve sleeve.

3. In a rotary servo-valve: a valve casing having a cylindrical bore, a cylindrical valve member fitting the bore at one end of the casing and having a reduced diameter portion projecting toward the other end of the casing, an annular valve sleeve fitting the annular space between the said projecting portion of said valve member and the bore of the casing, a plurality of pressure and exhaust channels in said valve member terminating in ports in two axially spaced planes within said valve sleeve, ports in the sleeve in the said two planes adapted for registration with the ports in said valve member, and ports in the casing in continuous communication with the channels in said valve member and the ports in said sleeve.

4. In a rotary servo-valve: a valve casing having a cylindrical bore, a cylindrical valve member fitting the bore at one end of the casing and having a reduced diameter portion projecting toward the other end of the casing, an annular valve sleeve fitting the annular space between the said projecting portion of said valve member and the bore of the casing, a plurality of pressure and exhaust channels in said valve member terminating in ports in two axially spaced planes within said valve sleeve, ports in the sleeve in the said two planes adapted for registration with the ports in said valve member, ports in the casing in continuous communication with the channels in said valve member and the ports in said sleeve, and means extending into opposite ends of said casing for selectively rotating said valve member and valve sleeve.

5. In a hydraulic system: a servo-valve, said servo-valve comprising a cylindrical valve casing, a valve sleeve in the casing adjacent one end thereof, a rotatable valve member in said casing adjacent the other end thereof, said valve sleeve and valve member being arranged in telescoping relation, pressure and exhaust ports in the said other end of said casing and pressure and exhaust channels in said valve member in continuous communication with said ports, a pair of axially spaced service ports in the said one end of said casing and a pair of service ports in said valve sleeve in continuous communication with said service ports, said pressure and exhaust channels in said valve member terminating in ports in the respective planes of the service ports in the said valve sleeve, a reversible hydraulic motor connected to said service ports, a source of fluid pressure connected to said service ports, means drivingly connecting said motor with said valve sleeve, and means for rotating said valve member.

6. In a hydraulic system: a servo-valve comprising: a valve casing having a cylindrical bore, a cylindrical valve member fitting the bore at one end of the valve casing and having a reduced diameter portion projecting toward the other end of the casing, a valve sleeve in the said other end of the valve casing fitting the annular space between the bore in the casing and the said portion of the valve member, pressure and exhaust ports in the valve casing and channels leading therefrom in said valve member terminating in other ports opening to the interior of said sleeve, ports in the sleeve adapted for registration with the said other ports in said valve member, service ports in said casing in continuous communication with the said ports in said valve sleeve, a fluid motor connected to said service ports, means drivingly connecting the motor with said sleeve, and means for effecting micrometer adjustment of said valve member.

7. In a hydraulic system: a servo-valve comprising: a valve casing having a cylindrical bore, a cylindrical valve member fitting the bore at one end of the casing and having a reduced diameter portion projecting toward the other end of the casing, an annular valve sleeve fitting the annular space between the said projecting portion of said valve member and the bore of the casing, a plurality of pressure and exhaust channels in said valve member terminating in ports in two axially spaced planes within said valve sleeve, ports in the sleeve in the said two planes adapted for registration with the ports in said valve member, ports in the casing in continuous communication with the ports in said sleeve, a fluid motor connected to the ports in the casing, means extending into one end of the casing drivingly connecting said motor with said sleeve and means extending in the other end of the casing for micrometer adjustment of said valve member.

8. In a hydraulic system: a servo-valve comprising: a valve casing with a cylindrical bore, a cylindrical valve member in one end of the bore and having a reduced diameter portion projecting toward the other end of the bore, a valve sleeve in the said other end of the bore surrounding said reduced diameter portion of the valve member, pressure and exhaust ports in the valve casing communicating with the said one end of the bore, pressure and exhaust channels in said valve member in continuous communication with said pressure and exhaust ports and leading through said valve member and terminating in other ports opening to the interior of said sleeve, ports in said sleeve adapted for variable registration with the said other ports in said valve member upon relative rotation of said sleeve and valve member, service ports in said casing in continuous communication with the said ports in said valve sleeve, a fluid motor connected to said service ports, means for rotatably adjusting said valve member, and a source of fluid pressure connected between said pressure and exhaust ports.

References Cited in the file of this patent
UNITED STATES PATENTS

| Number | Name | Date |
|---|---|---|
| 271,326 | Frazier | Jan. 30, 1883 |
| 626,593 | Cash | June 6, 1899 |
| 1,773,794 | Schneider | Aug. 26, 1930 |
| 2,022,698 | Vickers | Dec. 3, 1935 |
| 2,138,050 | Vickers | Nov. 29, 1938 |
| 2,216,800 | Baldenhofer | Oct. 8, 1940 |
| 2,271,817 | Ernst | Feb. 3, 1942 |
| 2,285,069 | Vickers | June 2, 1942 |
| 2,320,763 | Trautman | June 1, 1943 |
| 2,365,748 | Curtis | Dec. 26, 1944 |
| 2,380,705 | Proctor | July 31, 1945 |
| 2,406,173 | Stephens | Aug. 20, 1946 |
| 2,424,901 | Richolt | July 29, 1947 |
| 2,471,289 | Sedgwick | May 24, 1949 |
| 2,511,384 | Trevaskis | June 13, 1950 |
| 2,612,872 | Strayer | Oct. 7, 1952 |